United States Patent [19]

Nakabayashi et al.

[11] Patent Number: 4,963,862
[45] Date of Patent: Oct. 16, 1990

[54] TERMINAL EQUIPMENT IDENTIFIER CONTROL CIRCUIT

[75] Inventors: Takeo Nakabayashi; Hirohisa Machida, both of Itami, Japan

[73] Assignee: Mitsubishi Denki Kabushiki Kaisha, Tokyo, Japan

[21] Appl. No.: 216,915

[22] Filed: Jul. 8, 1988

[30] Foreign Application Priority Data

Jan. 7, 1988 [JP] Japan .................... 63-1495

[51] Int. Cl.⁵ .................... H04J 3/24; H04Q 11/00
[52] U.S. Cl. .................... 340/825.52; 340/825.51; 340/825.53; 370/92
[58] Field of Search .................... 340/825.52, 825.79, 340/825.51, 825.53, 825.83, 825.85, 825.87, 825.88; 365/201, 231; 370/85, 92; 379/90

[56] References Cited

U.S. PATENT DOCUMENTS

| | | | |
|---|---|---|---|
| 4,227,178 | 10/1980 | Gergaud et al. | 340/825.52 |
| 4,253,087 | 2/1981 | Saal | 340/825.52 |
| 4,285,038 | 8/1981 | Suzuki | 364/200 |
| 4,423,414 | 12/1983 | Bryant et al. | 340/825.52 |
| 4,792,801 | 12/1988 | Hofmann | 340/825.79 |
| 4,879,715 | 11/1989 | Nakabayashi et al. | 340/825.52 |

FOREIGN PATENT DOCUMENTS 1449739 1/1969 Fed. Rep. of Germany .................... 340/825.79

OTHER PUBLICATIONS

CCITT Recommendation I.440 and I.441, Chapter 5.3, pp. 219-224, (Oct. 1984).

Primary Examiner—Donald J. Yusko
Assistant Examiner—Yuk H. Lau
Attorney, Agent, or Firm—Townsend and Townsend

[57] ABSTRACT

This invention relates to a terminal identifier control circuit which provides automatic start of the check procedure to examine the unassigned/assigned distinction of a limited number of terminal identifiers by hardware, in a communications apparatus with a number of terminal equipment connected to a network.

12 Claims, 9 Drawing Sheets

(a) 8×8 grid with row labels (LOW ORDER 3BITS) 000–111 and column labels (HIGH ORDER 3BITS) 000,001,010,011,100,101,110,111; all cells 0.

(b) 8×8 grid, all 0 except row 100, column 010 = 1.

(c) 8×8 grid, all 0 except: row 001 col 110 = 1; row 011 col 100 = 1; row 100 col 010 = 1; row 111 col 000 = 1.

(d) 8×8 grid, all 0 except: row 001 col 110 = 1; row 011 col 100 = 1; row 100 col 010 = 1; row 111 col 000 = 1 (shaded).

(e) 8×8 grid, all 0 except: row 001 col 110 = 1; row 010 col 001 = 0 (shaded); row 011 col 100 = 1; row 100 col 010 = 1; row 111 col 000 = 1.

(f) 8×8 grid, all 0 except: row 011 col 100 = 1; row 100 col 010 = 1; row 111 col 000 = 1.

TERMINAL EQUIPMENT IDENTIFIER CONTROL CIRCUIT

BACKGROUND OF THE INVENTION

1. Field of the Invention

The present invention relates to a communications apparatus with a number of terminal equipments connected to a network. More particularly, it relates to a control circuit for controlling terminal identifiers for identifying terminal equipments.

2. Description of the Prior Art

Figure 1:
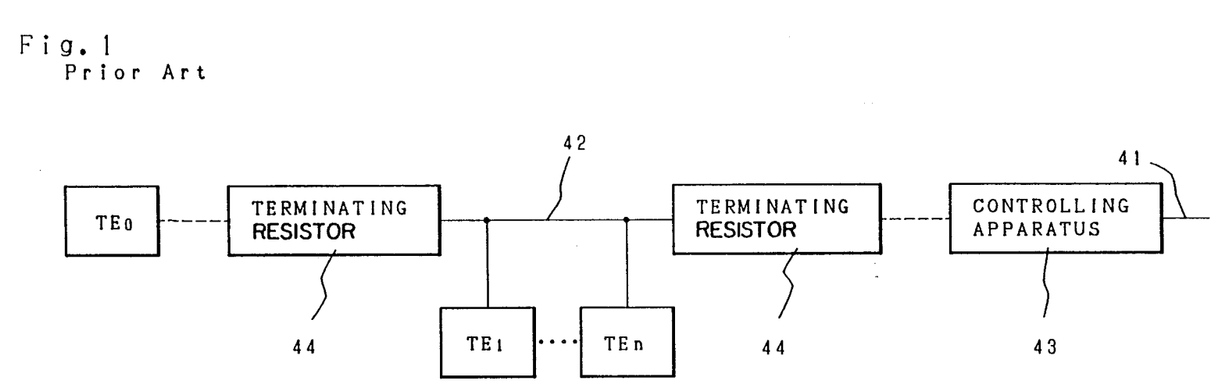
FIG. 1 is a block diagram showing a configuration of an in-house network.

The apparatus performing communication processing according to the HDLC (High-level Data Link Control)-type data link layer controlling procedure has been known. FIG. 1 shows a configuration of an in-house network shown in the CCITT Recommendation I.430, and a subscriber line 41 such as a telephone line controls an in-house bus 42, and a controlling apparatus 43 terminating the subscriber line is connected thereto, and terminal equipments TE0, TE1 . . . TEn such as a telephone and a facsimile are connected to the in-house bus 42. Numerals 44, in the figure designate terminating registors.

In the above-mentioned Recommendation, one telephone number corresponds to one controlling apparatus 43, and discrimination of the terminal equipments TE0, TE1 . . . TEn is made using subaddresses called terminal equipment identifiers TEI. For this reason, the terminal equipments are to exchange signals for determining the TEI value with the network, prior to communication, to secure the TEI value thereof. When the communication is completed, the terminal equipments may release their TEI values.

The network, on the other hand, gives an unused TEI to the terminal equipment every time assignment of a TEI is requested by a terminal equipment. This TEI normally is not released even after the communication has been completed. According to the above recommendation, there are maximum 8 terminal equipments and maximum 128 TEI values. Since the network does not release a TEI value once used, after a communication has been completed, the TEI values to be assigned to a terminal equipment may run short after repeated communications.

In such a situation, the network starts the TEI check procedure to check if TEIs are being used or not, and releases an unused TEI value to provide for the next TEI assignment request.

So far, the above release process has been exercised by software, but the processing rate is small and there is a problem that a TEI assignment request just after the TEI value has run short cannot be answered. There is also another problem that the processing by software uses the bus in the system, resulting in restricting the data processing rate.

SUMMARY OF THE INVENTION

In order to solve the problem mentioned above, the present invention has been made, and it is an object of the present invention to provide a terminal equipment identifier control circuit which permits higher data processing rate by obtaining the TEI check procedure starting signal equipment by hardware.

The terminal equipment identifier control circuit according to the invention writes different data for unassigned TEI value and assigned TEI value making the memory address correspond to the TEI value and sends out a signal for starting the check procedure for checking assigned/unassigned distinction of the terminal equipment identifier when all the addresses are turned to assigned data.

To assign a terminal equipment identifier to a terminal equipment, the network gives the terminal identifier as the address signal to this memory and writes, for example, "1" in the corresponding address. Thus, unassigned/assigned distinction can be judged by reading the memory; "1" --assigned, "0" -- unassigned.

When all the addresses become "1", that is, all the TEI values become "assigned", a check procedure start signal is sent out.

The above and further objects and features of the invention will more fully be apparent from the following detailed description with accompanying drawings.

DESCRIPTION OF THE PREFERRED EMBODIMENTS

Figure 2:
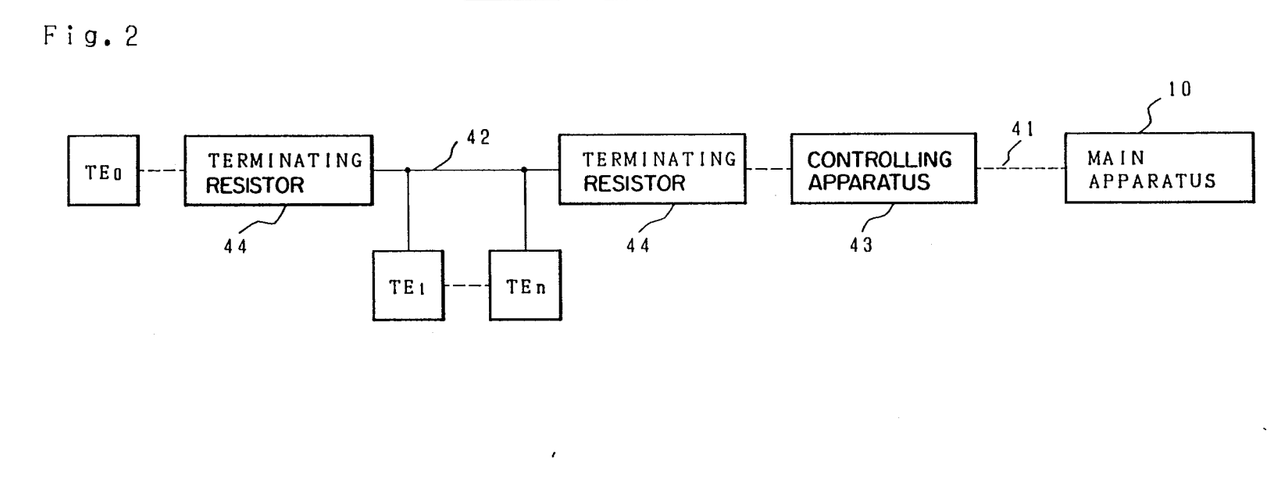
FIG. 2 is a block diagram showing a schematic construction of the whole communications apparatus according to the invention.
Figure 3:
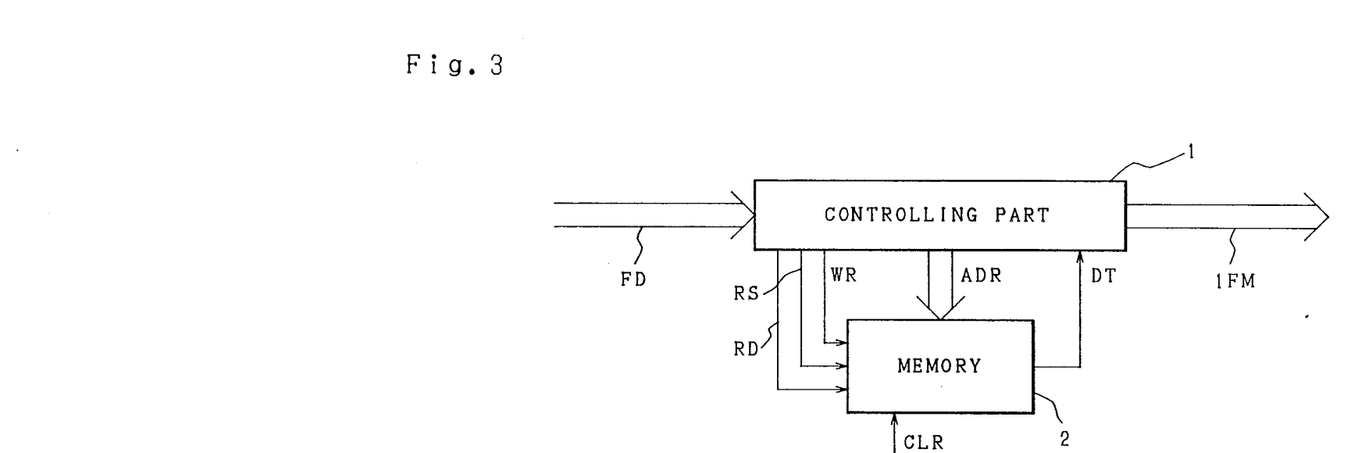
FIG. 3 is a block diagram showing the essential part of a terminal equipment of the invention.
Figure 4:
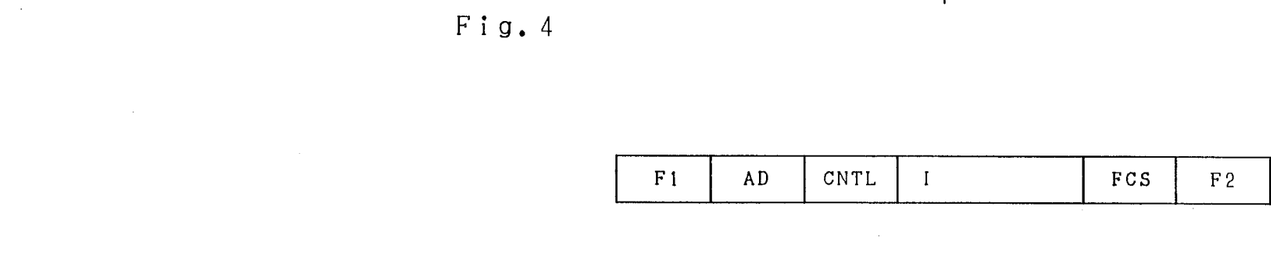
FIG. 4 is a format diagram of a frame data.

Hereinafter, detailed description is made on the present invention on the basis of the drawings showing an embodiment thereof. FIG. 2 is a block diagram showing a schematic configuration of the whole apparatus in accordance with the present invention, and FIG. 3 is a block diagram showing a major part of terminal equipments thereof TE0, TE1 . . . TEn. FIG. 2 shows the configuration of the in-house network shown in the CCITT Recommendation I.430, and thereto a main apparatus 10 installed in a telephone exchange office or the like is connected through a subscriber line 41 such as a telephone line. The subscriber line 41 is connected to a controlling apparatus 43 controlling an in-house bus 42 and terminating the subscriber line 41, and the terminal equipments TE0, TE1 . . . TEn such as a telephone and a facsimile are connected to the in-house bus 42. In the figure, numerals 44 designate terminating registors. In FIG. 3, numeral 1 designates a control part making access to a memory 2 on the basis of the received signal and HDLC frame data FD is inputted thereto from the network side, that is, the main apparatus 10 through the subscriber line 41, the controlling apparatus 43, the terminating registor 44 and the in-house bus 42. This frame data FD has a format as shown in FIG. 4, and consists of a flag F1 representing the head of the data, an address data AD including a terminal equipment identifier TEI, a control code part CNTL representing character or the like of the transmitted data, a data I to be transmitted, an error check data ECS and a flag F2 representing the end of the data. The controlling part 1 gives the data corresponding to the TEI from the address data AD to the memory 2 as an address signal ADR. Also, the controlling part 1 decodes the control code part CNTL, and outputs a write signal WR when writing "1", a release signal RS when writing "0", and a read signal RD when reading data from the memory 2 respectively in a select-one fashion to the memory 2 whereto access is made by the address signal ADR. A data DT read from the memory 2 is given to the controlling part 1. Also, the configuration is made so as to give a clear signal CLR to the memory 2 when resetting the contents of the whole addresses of the memory 2 to "0", and the clear signal CLR may be given by a switch or the like installed in the terminal equipment side or may be given from the network side.

The controlling part 1 judges whether or not the received data is for itself as described later, and when the data is for itself, it gives the data I or the like excluding the Flags F1 and F2 and the control code part CNTL to a post-stage circuit in the terminal equipment.

Figure 5:
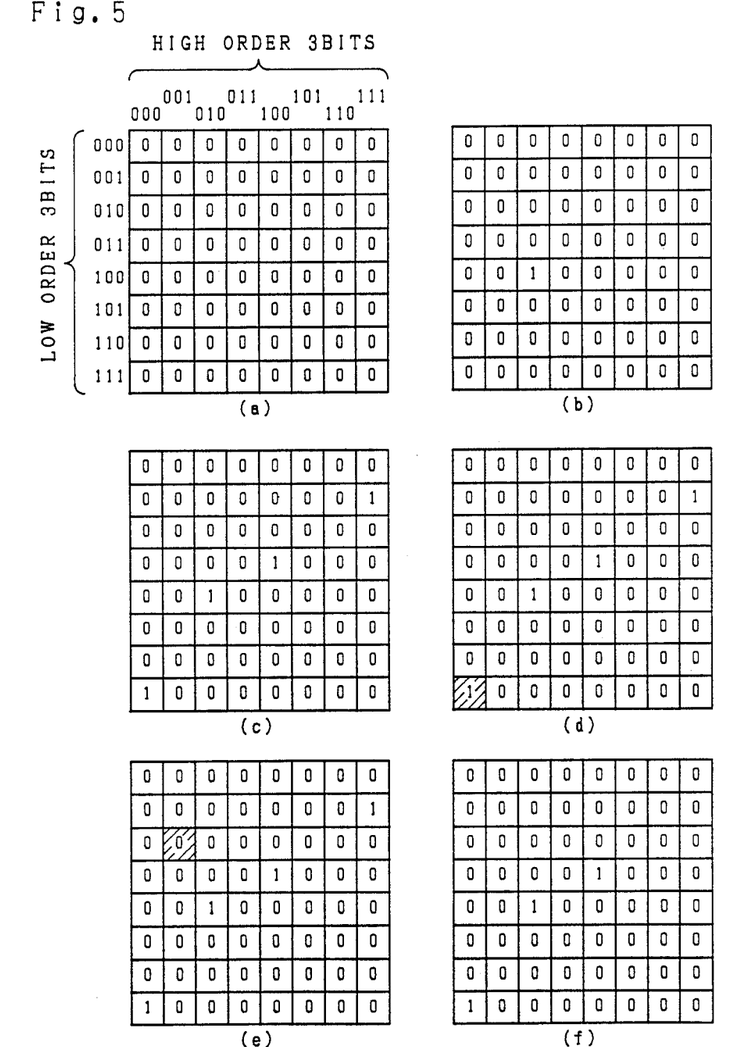
FIG. 5 is a conceptional diagram of the contents of a memory.

Next, description is made on the operation of the apparatus in accordance with the present invention on the basis of FIG. 5 showing the stored contents of the memory 2. As shown in FIG. 3, the memory 2 has a configuration of 8×8 bits, and the high-order three bits of the address signal ADR (six bits) are taken as column address and the low-order three bits as row address. Before using this apparatus or a terminal equipment, the clear signal CLR is given to reset the memory 2. Then, all of the contents of the memory 2 become "0" as shown in FIG. 5(a).

Subsequently, a TEI is assigned to that terminal equipment from the network side, and in this case, the address frame data AD received from the main apparatus 10 comprises the address data containing the assigned TEI value and the control code part CNTL having the contents showing that the transmitted signal is for assigning the TEL value. The controlling part 1 having received this outputs the write signal WR, and outputs the TEI value as the address signal ADR. In the case where the assigned TEI value is 20 (010100), "1" is written to the address of the third column (010) and the fifth row (100) shown in FIG. 5(b). Thereby, this terminal equipment is assigned the TEI value of "20".

Then, when the normal frame data FD is received in the subsequent communication, the controlling part 1 extracts the TEI value from the address data AD in that data, gives it to the memory 2 as the address signal ADR, and gives the it to the memory 2 as the address signal ADR, and gives the read signal RD. In the case where the received TEI value is "20", the read data is "1", and the controlling part 1 takes in the received data as the one for itself.

On the other hand, when the value is not "20", access is made to the address where the stored data is "0", and therefore "0" is read. In this case, the controlling part 1 neglects it as data for another equipment.

FIG. 5(c) shows the contents of the memory 2 of the terminal equipment whereto a plurality of TEI values are assigned. In this case, 7(000111), 35(100011) and 57(111001) are assigned as the TEI values in addition to the above-described "20". This means that the data of addresses of the first column (000) and the eighth row (111), the fifth column (100) and the fourth row (011), and the eighth column (111) and the second row (001) are "1". In this terminal equipment, in the case where any one of the TEI values 20, 7, 35 and 57 is given in the frame data FD, the read data DT becomes "1", and the controlling part 1 takes in this as the data for itself. FIG. 5(d) shows the data of the address in the case where the TEI value of the received data is "7" by hatching.

FIG. 5(e) shows the read data "0" in the case where the TEI value of the received data is "10"(001010) by hatching. In this case, the received data is neglected.

As described above, in the case where the TEI values are assigned, when any one of the TEI values is released, the frame data FD having the corresponding control code part CNTL and the TEI value to be released is transmitted from the main apparatus 10. The controlling part 1 having received this gives this TEI value to the memory 2 as the address signal ADR, and gives the release signal RS. Now, in the case where the TEI value to be released is 57, as shown in FIG. 5(f), the data of the address of the eighth column and the second row is replaced by "0".

Figure 6:
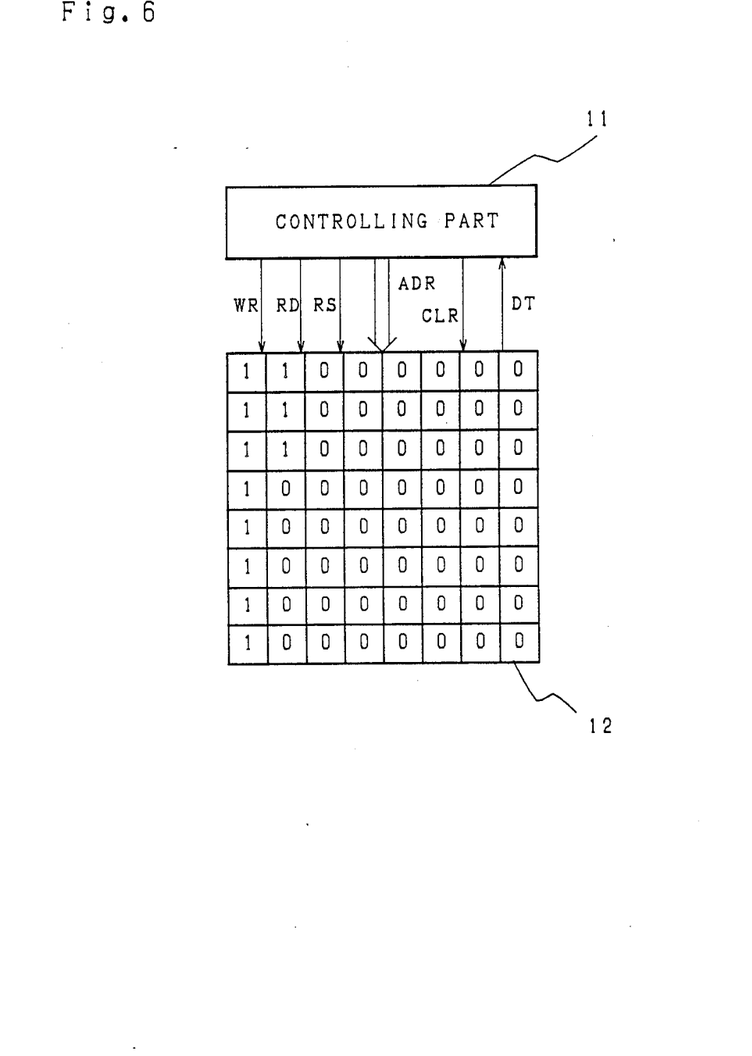
FIG. 6 is a block diagram showing the principal part of the main apparatus.

Then, such a memory is also installed in the main apparatus 10 side. FIG. 6 shows a major part of the main apparatus 10 having a controlling part 11 and a memory 12. Before assigning the TEI values, the controlling part 11 gives the clear signal CLR to the memory 12, resetting all of the stored contents to "0". In assigning the TEI value to any one of the terminal equipment TE0, TE1 . . . TEn subsequently, the controlling part 11 gives this TEI value to the memory 12 as the address signal ADR, and gives the write signal WR to the memory 12. Thereby, the data of the address corresponding to the TEI value having been assigned becomes 1. Now, in the case where "0", "1", "2", "3", "4", . . . "10" are assigned as the TEI values to a single or a plurality of terminal equipments, the contents of the memory becomes as shown in FIG. 6.

Then, in the case where the TEI value is assigned anew to any one of the terminal equipments, the TEI value having been assigned must not be used. Then, the controlling part 11 gives the TEI value planned to be assigned to the memory 12 as the address signal ADR, giving the read signal RD to the memory 12. Thereby, the data DT of the corresponding address is read out to the controlling part 11.

If the read data DT is "0", the TEI value thereof has not been assigned, and in reverse, if it is "1", it can be judged that the value has been assigned.

In the case where the TEI value having been assigned is released, this TEI value is given to the memory 12 as the address signal ADR, and the release signal RS is given to the memory 12. Thereby, the data of the corresponding address is re-written from "1" to "0", becoming a value which can be assigned anew.

Figure 7:
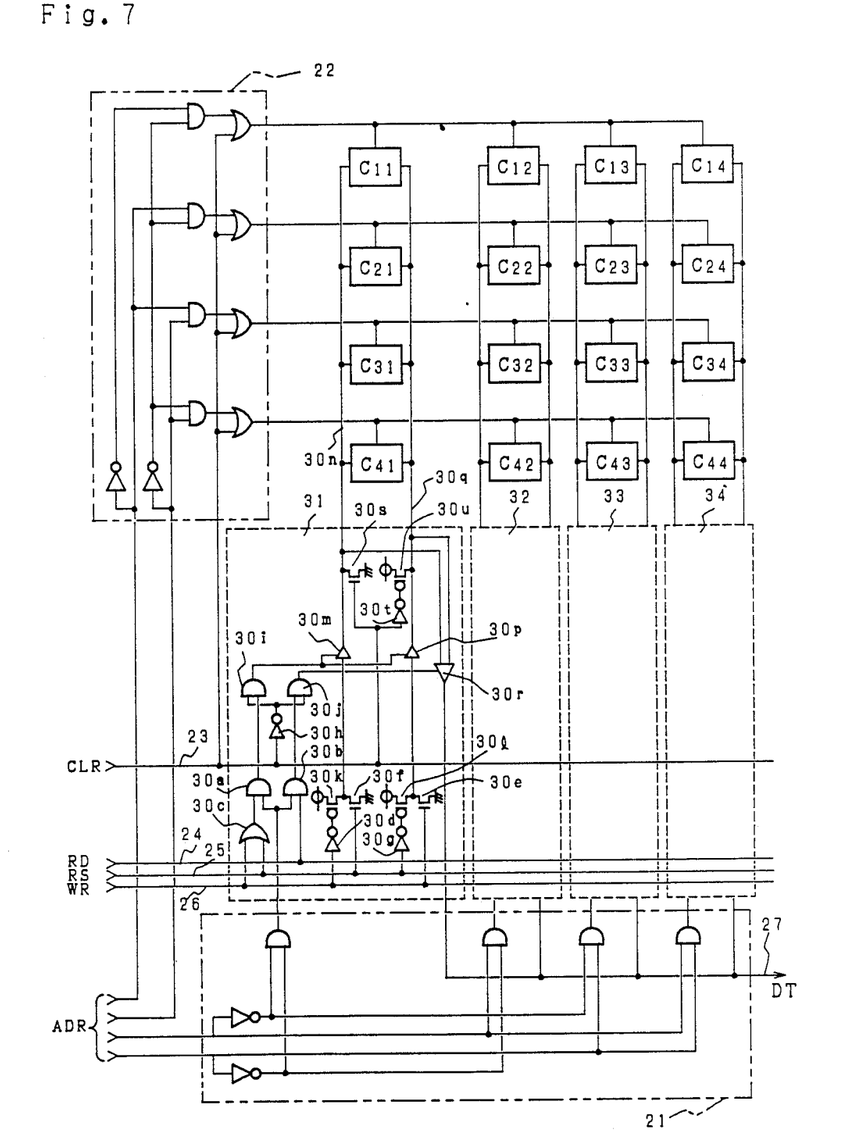
FIG. 7 is a circuit diagram around the memory of the terminal equipment.

FIG. 7 is a circuit diagram showing a configuration of the memory 2, and here an example in the case where the total number of TEIs is 16 (=2⁴) is illustrated, and a memory has a configuration of four rows and four columns, and the address signal ADR is of four bits.

The high-order two bits and the low-order two bits of the address signal ADR are given to address decoding parts 21 and 22. The first, the second, the third and the fourth columns are selected corresponding to (0,0), (0,1), (1,0), and (1,1) of the two high-order bits respectively, and the first, the second, the third and the fourth rows are selected corresponding to (0,0), (0,1), (1,0) and (1,1) of the two low-order bits respectively. Symbols $C_{11}, C_{12} \ldots C_{44}$ designate memory cells, and symbol Cij (i,j=1~4) designates a cell of row i and column j. Numerals 31, 32, 33 and 34 designate writing and reading circuits on a colum basis installed for writing, reading, releasing and clearing. These writing and reading circuits 31, 32, 33 and 34 are configured with combinations of logical circuits, and are given the clear signal CLR, the read signal RD, the release signal RS and the write signal WR through respective lines 23, 24, 25 and 26, being given the select signal of each column from the address decoding part 21. Also, the read data DT is outputted through a data line 27.

Next, description is made on a configuration of the writing and reading circuit 31 and the like. Output of the address decoding part 21 is given to AND gates 30a and 30b. The write signal WR is given to an OR gate 30c, an inverter 30d and the gate of an N-channel transistor 30e one end of which is of ground potential. The release signal RS is given to the OR gate 30c, the gate of a N-channel transistor 30f and an inverter 30g. The read signal RD is given to the AND gate 30b. The clear signal CLR is given to AND gates 30i and 30j through an inverter 30h, and to the gate of a N-channel transistor 30s and an inverter 30t.

Output of the OR gate 30c is given to the AND gate 30a. Output of the inverter 30d is given to the gate of a P-channel transistor 30h which is connected in series to the N-channel transistor 30f and is positioned on the power source side. Output of the inverter 30g is given to the gate of a P-channel transistor 30 which is connected in series to the N-channel transistor 30e and is positioned on the power source side. The potential of the intermediate node of a series circuit of transistors 30k and 30f is given to a bit line 30n through a tri-state buffer 30m. The potential of the intermediate node of a series circuit of the transistors 30 and 30e is given to a bit line 30q through a tri-state buffer 30p. Outputs of the AND gates 30a and 30b are given to the AND gates 30i and 30j, respectively. Output of the AND gate 30i is used as control signals of the tri-state buffers 30m and 30p, and output of the AND gate 30j is used as a control signal of a sense amplifier 30r. The sense amplifier 30r outputs binary data corresponding to the level of bit lines 30n and 30q as a readout signal to the data line 27.

Output of the inverter 30f is given to the gate of a P-channel transistor 30u. The transistor 30s is inserted between the bit line 30n and the ground potential, and the transistor 30u is inserted between the power source potential and the bit line 30q.

Next, description is made on the operation of this writing and reading circuit 31. When a control signal is given, the transistors 30s and 30r are both put in the conductive state, the bit line 30n goes low, the bit line 30q goes high, and "0" is written to each memory cell.

When the write signal WR is given, one input of the AND gate 30a of the column selected by the address decoding part 21 goes high, and therefore the output of the AND gate 30i goes high, and the tri-state buffers 30m and 30p are opened. On the other hand, the transistors 30k and 30e are turned on, and therefore the bit line 30n goes high, and the bit line 30q goes low, and in reverse to the case of the clear signal, "1" is written to the memory cell of the selected memory row.

In reverse, in the case where the release signal RS is given, the tri-state buffers 30m and 30p are opened likewise, but in this case, the transistors 30f and 30 are turned on, and therefore the bit line 30n goes low, the bit line 30q goes high, and "0" is written to the selected memory cell.

Next, in the case where the read signal RD is given, the output of the AND gate 30b of the selected column goes high, and the output of the AND gate 30j starts the sense amplifier 30r to read the contents of the accessed memory through the bit lines 30n and 30q.

Figure 8:
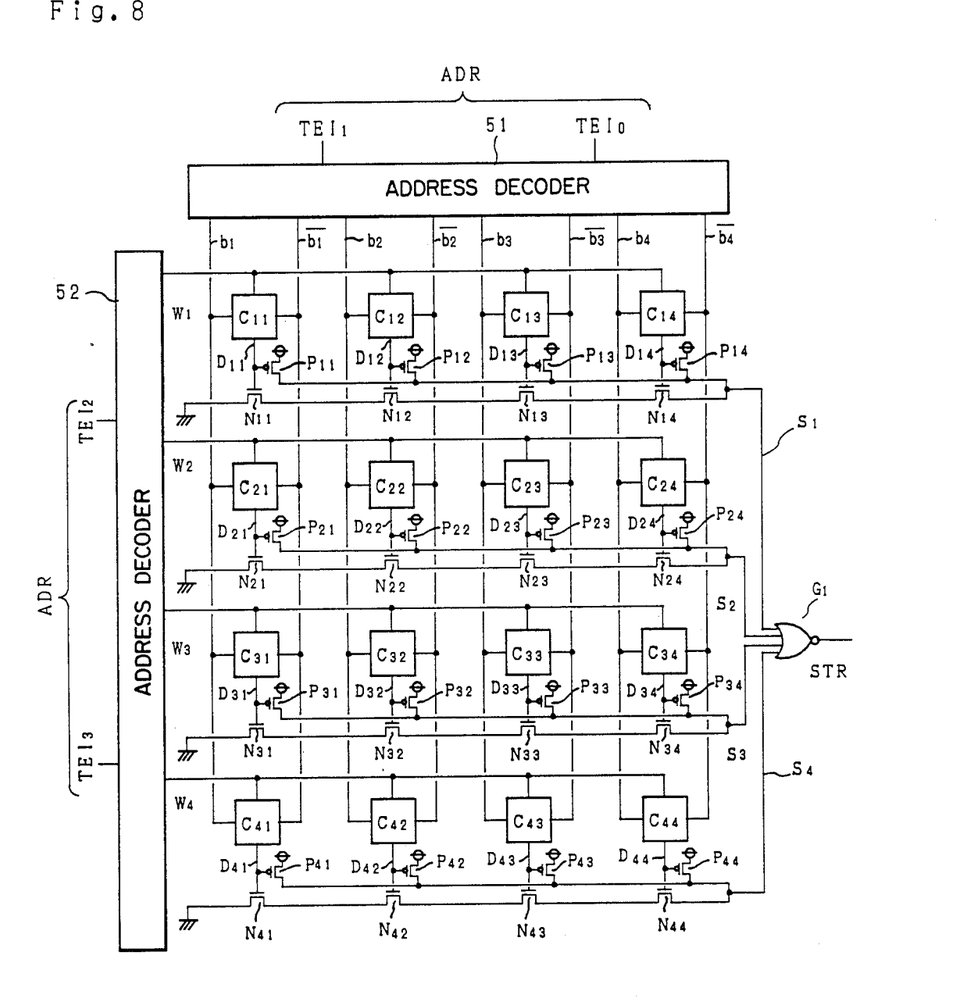
FIG. 8 is a circuit diagram around the memory of the main apparatus.

FIG. 8 shows the configuration of the memory 12 having a total number of 16 ($=2^4$) of TEIs likewise the memory 2 in FIG. 7.

The memory cells are represented by $C_{11}, C_{12} \ldots, C_{44}$. Address decoders 51, 52 giving address signals ADR are the same as the address decoders 21, 22 shown in FIG. 7, and indicates each bit of 4-bit binary numbers of the address signal ADR by $TEI_0-TEI_3$. The lower bits $TEI_0$ and $TEI_1$ are decoded by the address decoder 51 and the signals are sent out to bit lines $b_1, \bar{b}_1, b_2, \bar{b}_2, b_3, \bar{b}_3$, and $b_4, \bar{b}_4$ of four memory cell columns. The upper bits $TEI_2, TEI_3$ are decoded by the address decoder 52, and the signals are sent out to the word lines $w_1, w_2, w_3$, and $w_4$ of four memory cell rows.

Figure 9:
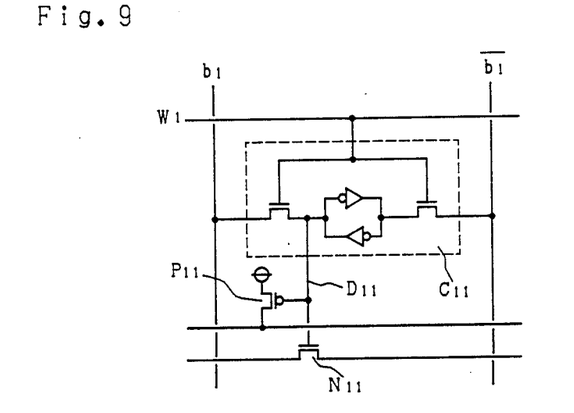
FIG. 9 is a circuit diagram of a memory cell.

FIG. 9 shows the configuration of the memory cells of $C_{11}$. The configuration itself is known.

The readout lines $D_{11}, D_{12}, \ldots D_{44}$ of the data held by the memory cells are connected to the gates of the transistors $P_{11}, P_{12}, \ldots P_{44}$ of the P channel and of the transistors $N_{11}, N_{12}, \ldots N_{44}$ of the N channel, respectively. The transistors of the P channel are connected with one end thereof to the power source and with the other end thereof collectively at every row to the input lines $S_1, S_2, S_3,$ or $S_4$ of the NOR gate $G_1$. The N channel transistors are connected in series at every row, and grounded with one end and connected with the other end to the input line $S_1, S_2, S_3,$ or $S_4$ of the NOR gate. The output of the NOR gate $G_1$ is used for the check procedure starting signal equipment.

Then, the operation of the memory 12 is described. Reset of all the memory cells by a clear signal CLR, writing of "1" by a writing signal WR, writing of "0" by a release signal RS, and readout of held data by a readout signal RD are in the same way as those in the memory 2, therefore the explanation of the operation thereof is omitted.

When all the data held by the memory cells $C_{11}, C_{12}, \ldots C_{44}$ become "1", that is, all the TEI values become occupied, the output of the NAND gate comprising parallel circuits such as four P channel transistors $P_{11}, P_{12}, P_{13},$ and $P_{14}$, and series circuits such as four N channel transistors $N_{11}, N_{12}, N_{13},$ and $N_{14}$, that is, all the data such as the input line $S_1$ and the like of the NOR gate $G_1$ becomes "0" and the output of the NOR gate $G_1$ becomes "1". Thus, a check procedure starting signal equipment STR is obtained.

When data held by some memory cell are "0", that is, some TEI value are unassigned, the N channel transistor is turned OFF and the P channel transistor is ON. Accordingly, some of the input lines $S_1, S_2, S_3, S_4$ become "1" and the NOR gate output STR becomes "0". Thus, any check procedure starting signal equipment cannot be obtained.

Figure 10:
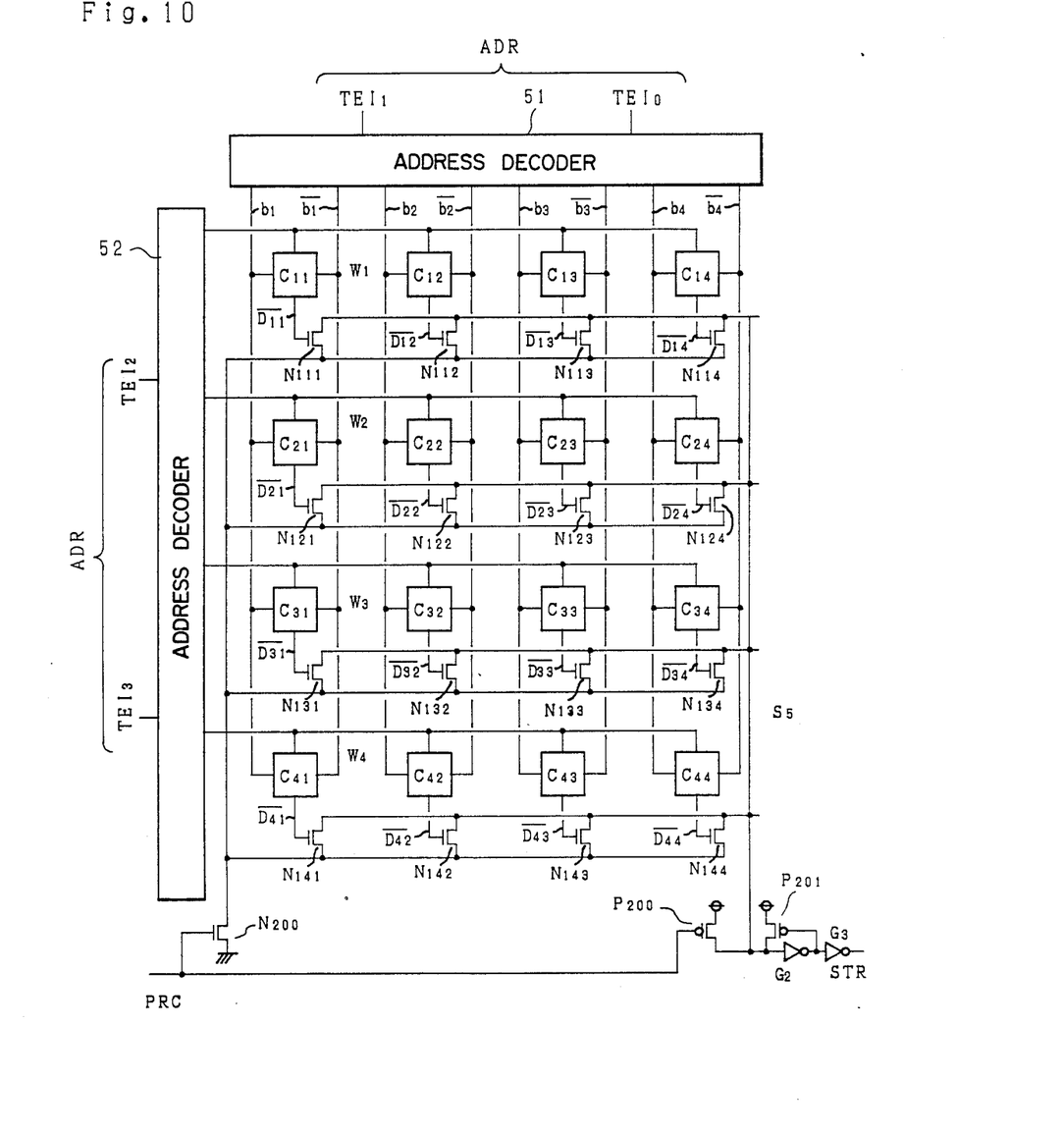
FIG. 10 is a circuit diagram around the memory of another embodiment.
Figure 11:
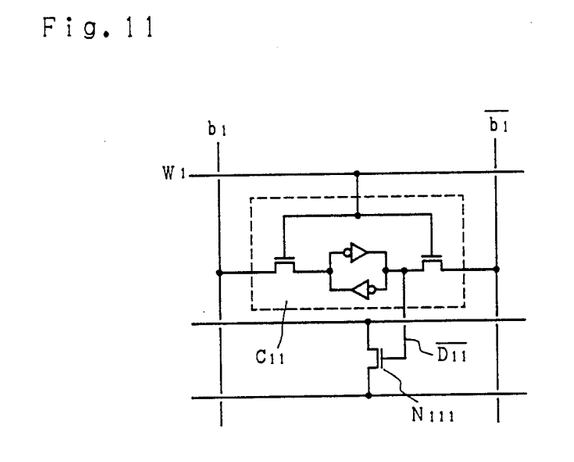
FIG. 11 is a circuit diagram of a memory cell.

FIG. 10 shows another embodiment of the memory 12, and FIG. 11 shows the circuit around the memory cell$_{11}$. The connection of bit lines $b_1, \bar{b}_1, b_2, \bar{b}_2, b_3, \bar{b}_3, b_4$, and $\bar{b}_4$ and word lines $W_1, W_2, W_3,$ and $W_4$ to the memory cells $C_{11}, C_{12}, \ldots C_{44}$ is in the same way as that in FIG. 8.

In this embodiment, data readout lines $\bar{D}_{11}, \bar{D}_{12}, \ldots \bar{D}_{44}$ are connected to the gates of the N channel transistors $N_{111}, N_{112}, \ldots N_{144}$, respectively, and the drains of these transistors are collectively connected to the source of the P channel transistors $P_{200}$ and $P_{201}$ connected in parallel, and the sources of the transistors $N_{111}, N_{112}, \ldots N_{144}$ are collectively connected to the drain of the transistor $N_{200}$. The source of the transistor is grounded and a precharge signal PRC is given to the gate. Between the source and gate of the transistor $P_{201}$, a NOT gate $G_2$ is interposed. The output of the NOT gate $G_2$ is used for the input of the NOT gate $G_3$, and the output of the NOT gate $G_3$ is used for the check procedure starting signal equipment. In this circuit, the transistors $N_{111}, N_{112}, \ldots N_{144}$ and the transistors $N_{200}$, $P_{200}$ constitute a precharge NOR gate.

When all the data held by the memory cells are turned into "1", the complementary data are read out. Since all the outputs of the readout lines $D_{11}, D_{12}, \ldots$ become "0", all the transistors $N_{111}, N_{112}, \ldots N_{144}$ are turned off, and a check procedure starting signal equipment STR is obtained from the NOT gate $G_3$.

In the above embodiment, the static NAND type (FIG. 8) and precharge NOR type (FIG. 10) are shown, but the memory 12 using a static NOR type and precharge NAND type or a load type with P channel transistors can also be configured.

In the above embodiment, arrangement of 16 memory cells is $4 \times 4$, but other arrangement such as $2 \times 8$ is also possible.

Figure 12:
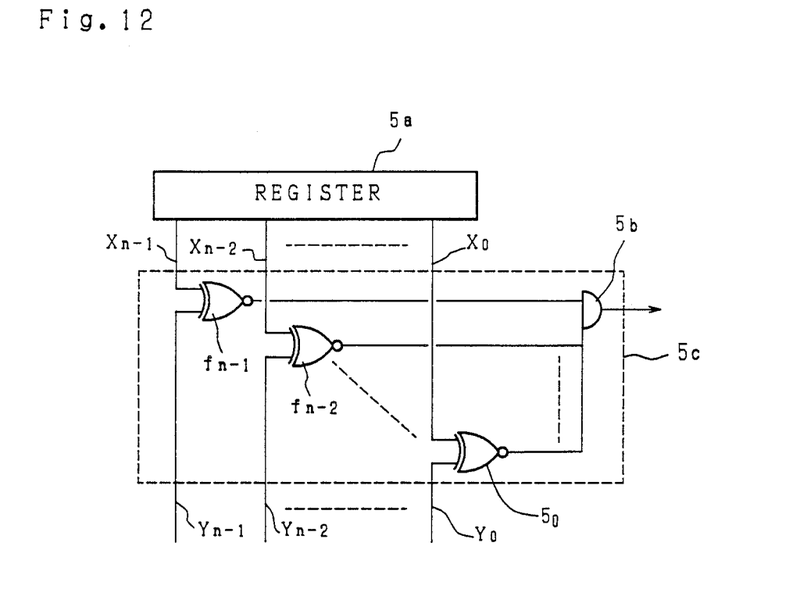
FIG. 12 is a circuit diagram showing the configuration of the principal part of the terminal equipment.

The TEI control of terminal eqipments may have such a configuration that a register 5a stores the TEI values and a comparator 5c compares a transmitted TEI value with the stored values, as shown in FIG. 12, instead of the configuration in the above embodiment where the TEI control is made by the memory 2 which is similar to the memory 12 in the main apparatus 10. The 5a is an n-bit register storing its own TEI value. Assuming this value to be $X_0, \ldots, X_{n-2}, X_{n-1}$, each of these bits is given to exclusive NOR gates $5_0, \ldots, 5_{n-2}, 5_{n-1}$. Received n-bit TEI value, $Y_0, \ldots, Y_{n-2}, Y_{n-1}$ is the other input of the NOR gate $5_0, \ldots, 5_{n-2}, 5_{n-1}$, and these outputs are inputted to the AND gate 5b of n inputs.

Symbol 5c represents a comparator configured by the NOR gates $5_0, \ldots, 5_{n-2}, 5_{n-1}$ and the AND gate 5b. As obvious from the configuration of the comparator 5c, when a received TEI value agrees with a TEI value of its own stored in the register 5a, an agreed output is given to the AND gate 5b. This allows the register 5b to judge that the received signal is addressed to itself and to take in the TEL value and the signal sent together. When both the values disagree each other, the signal is neglected.

Even when the control circuit is on the terminal-equipment side, the TEI values stored in the register 5a may be memorized by the memory 2.

The terminal equipment identifier control circuit according to the invention stores the unassigned/assigned distinction of the TEI value in the memory and sends out a check procedure starting signal equipment when all the TEI value is turned to "assigned". Thus, it has an advantage that it can make quick response to a request for TEI value assignment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intented to be embraced by the claims.

What is claimed is:

1. A terminal identifier control circuit in a communications apparatus for identifying a terminal unit, coupled to a network, by means of terminal identifiers, comprising:
    a memory, coupled to the terminal unit, having a number of address storage locations at least equal to a total number of the terminal identifiers to be assigned;
    means, coupled to said memory, for resetting said address storage locations of said memory to a first value representing an unassigned status;
    an address means, coupled to said memory, for giving said memory a terminal identifier as an address signal when assigning said terminal identifier to a terminal unit and for writing a second value, representing an assigned status, to said corresponding address of the memory;
    means, coupled to said memory, for detecting a condition when address storage locations of said memory have been written with said second value; and
    means, coupled to said memory and to said detecting means, for setting a check procedure starting signal when all of said address storage locations are detected as being written with said second value.

2. A terminal identifier control circuit as claimed in claim 1, wherein:
    said detecting means, corresponding to each address storage location, has each address storage location coupled to a detecting transistor, said detecting transistors being conductive when said address storage location has been written with said second value;
    each of said detecting transistors, logically arranged into a plurality of groups, and connected in series in their respective groups, each of said groups configuring a wired NAND gate having an output; and
    said setting means including a NOR gate having as inputs said outputs of all said wired NAND gates, the output of said NOR gate being said check procedure.

3. A terminal identifier control circuit as claimed in claim 1, wherein:
    said detecting means, corresponding to each address storage location, has each address storage location coupled to a detecting transistor, said detecting transistor becomes non-conductive when said address storage location has been written with said second value;
    each of said detecting transistors connected in parallel to form a parallel circuit; and
    said setting means including a control circuit, said control circuit responsive to a signal obtained from said detecting transistors when said parallel circuit is non-conductive, for setting said check procedure starting signal.

4. The control circuit of claim 1 wherein said memory, said resetting means, said detecting means, and said setting means are all provided as part of the network.

5. The control circuit of claim 2 wherein said memory, said resetting means, said detecting means, and said setting means are all provided as part of the network.

6. The control circuit of claim 3 wherein said memory, said resetting means, said detecting means, and said setting means are all provided as part of the network.

7. A control circuit for setting a check procedure signal when all of a plurality of terminal equipment identifiers have been assigned to one or more terminal equipment coupled in a network, comprising:
- a memory, coupled to each terminal equipment, said memory having a plurality of storage locations, each of said storage locations corresponding to a particular terminal equipment identifier to be assigned to said terminal equipment;
- means, coupled to each of said storage locations of each of said memories and responsive to a particular terminal equipment identifier to be assigned to a particular terminal equipment, for setting said storage location of said memory of said particular terminal equipment corresponding to said particular terminal equipment;
- means, coupled to said plurality of storage locations of said particular terminal equipment, for logically processing said storage locations of said terminal equipment; and
- means, coupled to said processing means, for setting the check procedure starting signal when all of said storage locations of said terminal equipment are set.

8. The control circuit of claim 7 wherein:
said address storage locations of said memory are logically arranged in groups;
said logical processing means including a plurality of transistors, said transistors forming a wired NAND gate for each of said logical groups of address storage locations to provide a complementary logical product for each group of storage locations; and
said setting means including logic circuitry to provide a complementary logical sum of each of said complementary logical products.

9. The control circuit of claim 7 wherein:
said logical processing means includes a transistor coupled to each address storage location, the plurality of transistors coupled to one another in parallel to form a wired precharge NOR gate;
said transistor becoming nonconductive when said address storage location to which it is coupled is set;
said setting means including logic circuitry for setting said check procedure starting signal when said plurality of transistors become nonconductive.

10. The control circuit of claim 7 wherein said memory, said resetting means, said detecting means, and said setting means are all provided as part of the network.

11. The control circuit of claim 8 wherein said memory, said resetting means, said detecting means, and said setting means are all provided as part of the network.

12. The control circuit of claim 9 wherein said memory, said resetting means, said detecting means, and said setting means are all provided as part of the network.

* * * * *

REEXAMINATION CERTIFICATE (3913th)

United States Patent [19]
Nakabayashi et al.

[11] B1 4,963,862
[45] Certificate Issued Nov. 2, 1999

[54] TERMINAL EQUIPMENT IDENTIFIER CONTROL CIRCUIT

[75] Inventors: Takeo Nakabayashi; Hirohisa Machida, both of Itami, Japan

[73] Assignee: Mitsubishi Denki Kabushiki Kaisha, Tokyo, Japan

Reexamination Request:
No. 90/005,031, Jul. 1, 1998

Reexamination Certificate for:
Patent No.: 4,963,862
Issued: Oct. 16, 1990
Appl. No.: 07/216,915
Filed: Jul. 8, 1988

[30] Foreign Application Priority Data

Jan. 7, 1988 [JP] Japan .................................. 63-1495

[51] Int. Cl.[6] ........................................ H04Q 1/00
[52] U.S. Cl. ........................ 340/825.52; 340/825.51; 340/825.53; 370/254
[58] Field of Search ................. 340/825.52, 825.51, 340/825.53, 825.83, 825.85, 825.87, 825.88; 370/475

[56] References Cited

U.S. PATENT DOCUMENTS

| | | | |
|---|---|---|---|
| 4,227,178 | 10/1980 | Geraund et al. | 340/825.52 |
| 4,253,087 | 2/1981 | Saal | 340/825.52 |
| 4,285,038 | 8/1981 | Suzuki et al. | 364/200 |
| 4,423,414 | 12/1983 | Bryant et al. | 340/825.52 |
| 4,792,801 | 12/1988 | Hofmann | 340/825.79 |
| 4,879,715 | 11/1989 | Nakabayashi et al. | 340/825.52 |

FOREIGN PATENT DOCUMENTS

| | | | |
|---|---|---|---|
| 1449739 | 1/1969 | Germany | 340/825.79 |
| OS 2333137 | 9/1988 | Germany . | |

OTHER PUBLICATIONS

CCITT Recommendation I.440 and I.441, Chapter 5.3, pp. 219–224, (Oct. 1984).

*Primary Examiner*—Brian Zimmerman

[57] ABSTRACT

This invention relates to a terminal identifier control circuit which provides automatic start of the check procedure to examine the unassigned/assigned distinction of a limited number of terminal identifiers by hardware, in a communications apparatus with a number of terminal equipment connected to a network.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *